United States Patent [19]

Nalewajek et al.

[11] Patent Number: 4,695,522
[45] Date of Patent: * Sep. 22, 1987

[54] AQUEOUS BATTERY WITH $(C_y F_x Cl_z)_n$ CATHODE

[75] Inventors: David Nalewajek, West Seneca; Jung T. Kim, Williamsville; Lynn E. McCurry, Hamburg, all of N.Y.

[73] Assignee: Allied Corporation, Morristownship, Morris County, N.J.

[*] Notice: The portion of the term of this patent subsequent to Oct. 22, 2002 has been disclaimed.

[21] Appl. No.: 900,280

[22] Filed: Aug. 26, 1986

Related U.S. Application Data

[63] Continuation of Ser. No. 756,202, Jul. 18, 1985, abandoned.

[51] Int. Cl.[4] ............................................. H01M 4/58
[52] U.S. Cl. .................................. 429/206; 429/218; 429/229
[58] Field of Search ................ 429/194, 229, 206, 218

[56] References Cited

U.S. PATENT DOCUMENTS 3,956,018 5/1976 Kozawa ............................... 429/229
4,548,881 10/1985 Nalewajek et al. ................. 429/194

Primary Examiner—Donald L. Walton
Attorney, Agent, or Firm—Jay P. Friedenson

[57] ABSTRACT

A novel high energy density aqueous cell exhibiting superior electrochemical properties is described. The use of the novel cathode composition, $(C_yF_xCl_z)_n$, permits the construction of a novel high energy density aqueous cell comprised of an anode, an alkaline electrolyte and a cathode, said cathode comprised of carbon fluoride chloride of the type $(C_yF_xCl_z)_n$: wherein y is 1 or 2; x is greater than 0 up to about 1.2; z is greater than 0 up to 0.1; and n denotes an infinitely large two dimensional array of $C_yF_xCl_z$ units.

The carbon fluoride chloride is composed of carbon, fluorine and chlorine, wherein the carbon can be chosen from the group consisting of graphite, coke, needle coke, charcoal, activated carbon, carbon blacks and the like. The carbon fluoride chloride described herein can be made in several ways, e.g. carbon can be reacted with chlorine monofluoride, ClF, to produce $(C_yF_xCl_z)_n$ or with mixtures of chlorine, $Cl_2$, and fluorine, $F_2$, to produce $(C_yF_xCl_z)_n$.

4 Claims, 6 Drawing Figures ature.

AQUEOUS BATTERY WITH $(C_yF_xCl_z)_n$ CATHODE

This application is a continuation of application Ser. No. 756,202 filed July 18, 1985, now abandoned.

DESCRIPTION

This invention relates to a novel high energy density aqueous battery exhibiting superior electrochemical properties. More particularly, this invention relates to an improvement in the performance of aqueous cells utilizing a zinc anode, an aqueous alkaline electrolyte, and a cathode comprised of carbon fluoride chloride of the general formula $(C_yF_xCl_z)_n$ wherein y is 1 or 2; x is greater than 0 and up to and including 1.2; z is less than or equal to 0.1; and n defines a two-dimensional array of $C_yF_xCl_z$ units having an infinitely large value. Batteries employing the improved cathode exhibit higher discharge voltages and extended shelf life characteristics.

BACKGROUND OF THE INVENTION

It is known from the prior art that carbon fluoride compounds of the type, $CF_x$, are active cathode materials in non-aqueous cells. Particular interest has centered on systems employing this cathode material, a non-aqueous electrolyte and a highly active metal anode such as lithium or sodium. An example of such a system, is disclosed in Braeuer, et al., U.S. Pat. No. 3,514,337 describing a high energy density battery composed of carbon fluoride of the general formula $(C_xF)_n$ where x lies in the range of 3.5 to 7.5 and a non-aqueous electrolyte and where n as noted above has an infinitely large value. In this formula, (i.e. $CF_x$), x translates to a range of 0.1 to 0.28. Work by Watanabe, et al. as disclosed in U.S. Pat. No. 3,536,532 describes a high energy density battery utilizing $CF_x$ where x lies in the range of 0.5 to a maximum of 1.0. The carbon fluoride cathode material prepared from crystalline carbon (i.e. graphite), exhibited higher energy densities and improved discharge performance when compared to $(C_xF)_n$. Additional work by Watanabe, et al. as disclosed in U.S. Pat. No. 3,700,502 also describes a high energy density system employing carbon fluoride of the type $CF_x$, where x lies in the range from greater than zero to one which is and prepared from amorphous carbon sources such as charcoal, activated carbon or coke. These cells exhibited extended shelf life due to the stability of the carbon fluoride in the electrolyte. In both of these systems, the electrolyte was a non-aqueous solution of an organic electrolyte (i.e. propylene carbonate and the like) and lithium perchlorate. The anode active material was an alkali metal such as lithium or sodium.

A similar cell composed of carbon fluoride as a cathode material having an x value greater than one and up to and including two has also been described by Gunther in U.S. Pat. No. 3,892,590. These materials are claimed to exhibit higher energy densities than prior art due to the increased fluorine content.

The electrochemical activity of carbon fluoride compounds, $(CF_x)_n$ in an aqueous cell, in which "n" is an infinitely large number and wherein the carbon fluoride composition consists mainly of an amorphous carbon, has been described by Kozawa in U.S. Pat. No. 3,956,018. Low closed circuit voltages on the order of one volt or less irrespective of drain rate have prevented the incorporation of these cells in any practical application.

In co-pending application U.S. Ser. No. 699,765, filed on Feb. 8, 1985, and entitled "High Energy Density Battery Cathode Composition" (now U.S. Pat. No. 4,548,881, issued Oct. 22, 1985), a novel material useful as an active cathode in a non-aqueous cell is described. That application differs from the present invention in that the prior application, Ser. No. 699,765, deals with the development of an alkali metal, Li/organic electrolyte (non-aqueous) battery. The fluoride-chloride compounds, $(C_yF_xCl_z)_n$, of the present invention exhibit substantially improved electrochemical activity when used as an active cathode material in aqueous zinc-alkaline systems. The higher operating voltages allow for replacement of the more expensive and potentially toxic silver oxide and mercuric oxide cells currently employed today.

SUMMARY OF THE INVENTION

In accordance with the invention, we have discovered an improved cell cathode material comprising a carbon-fluorine-chlorine composition. The novel-cathode composition of the invention comprises carbon-fluoride-chloride of the formula, $(C_yF_xCl_z)_n$, wherein y is 1 or 2, x is greater than 0 up to about 1.2, and z is greater than 0 up to 0.1 and n refers to an infinitely large two-dimensional array of $C_yF_xCl_z$ units. It is known that values for "n" ranging from 10 to tens of thousands can exist. The cathode of this invention permits the provision, in conjunction with a zinc anode and an aqueous electrolyte, of a unique high energy density aqueous cell.

The carbon fluoride chloride used to fabricate the cathode of this invention may have a y value up to 2, an x value of greater than zero and up to 1.2 and a z value of greater than zero and up to 0.1. In the preferred embodiments, the y value will vary from about 0.8 to 1.0, the x value will vary from about 0.7 to 1.1 and the z value will vary from about 0.001 to 0.1. Amongst the preferred embodiments that yield especially advantageous results are those in which $y=1$, $x=0.74$ to 1, and $z=0.001$ to 0.01. This range of values improves the performance of the battery by extending the amper-hour capacity at a particular drain rate as well as resulting in higher operating discharge voltages. A particularly advantageous feature of this aqueous cell is that it may be used as direct replacement for the expensive zinc-silver oxide or zinc-mercuric oxide cell.

Additional advantages of the invention will become more apparent and will be better understood by referring to the following detailed description considered in conjunction with the accompanying examples.

DETAILED DESCRIPTION OF THE INVENTION

Figure 1:
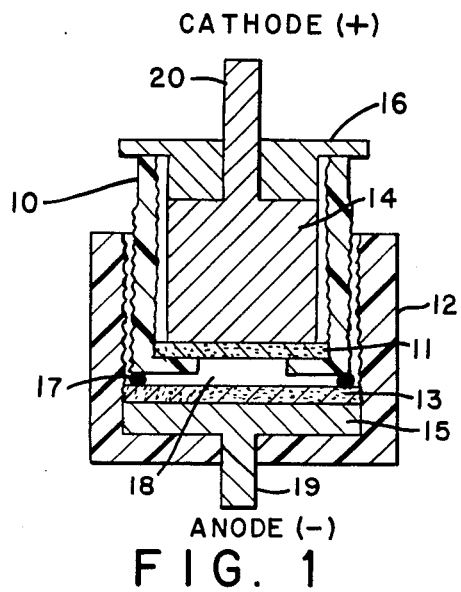
FIG. 1 is a cross sectional view of the experimental cell used to determine the voltaic performance of the novel cathode material described in this invention.

The invention describes a novel high energy density aqueous cell exhibiting superior electrochemical properties. The use of the novel cathode composition, $(C_yF_xCl_z)_n$, permits the construction of a novel high energy density aqueous cell comprised of an anode, an alkaline electrolyte and a cathode, said cathode comprised of carbon fluoride chloride of the formula $(C_yF_xCl_z)_n$; wherein y is 1 or 2, x is greater than 0 up to about 1.2; z is greater than 0 up to 0.1; and n denotes an infinitely large two dimensional array of $C_yF_xCl_z$ units.

The carbon fluoride chloride is composed of carbon, fluorine and chlorine wherein the carbon may be selected from the group of carbon substances consisting of graphite, coke, needle coke, charcoal, activated carbon, carbon blacks and the like. Preferably, the carbon fluoride chloride is produced from a needle coke. The carbon fluoride chloride described herein can be made in several ways as described in the prior art. For example, carbon can be reacted with chlorine monofluoride (ClF), to produce $(C_yF_xCl_z)_n$ or with mixtures of chlorine, $(Cl_2)$ and fluorine $(F_2)$, to produce $(C_yF_xCl_z)_n$. These procedures are referred in our co-pending application entitled "High Energy Density Battery Cathode Composition", U.S. Pat. Application Ser. No. 669,765, which describes the use of carbon fluoride in a nonaqueous cell, the disclosure of which is hereby incorporated by reference.

In the practice of this invention, the carbon fluoride chloride used to fabricate the cathode may have a y value of up to 2, an x value of greater than 0 and up to 1.2, and a z value of greater than 0 and up to 0.1. In the preferred embodiments of this invention, the y value will vary from about 0.8 to 1.0, the x value will vary from about 0.7 to 1.1; the z value will vary from about 0.001 to 0.1; and "n" as acknowledged in the prior art, denotes an indefinitely large number representing an infinitely large two dimensional array of $C_yF_xCl_z$ units similar to that found in naturally occurring fluorinated carbonaceous materials. The number "n" of repeating units can vary, for example, from 10 to >100,000 and greater.

Amongst the particularly preferred embodiments are those in which y=1, x=0.7 to 1.1, and z=0.001 to 0.01. In this range the performance of the battery, the ampere-hour capacity and the discharge voltages delivered at a particular rate are significantly improved.

The electrolyte used in the cells of the present invention may be selected from the group consisting of aqueous solutions of alkaline metal salts such as potassium, sodium, or lithium hydroxide, as well as mixtures thereof. Aqueous solutions of potassium hydroxide of concentration in the range of 5-14 molar are preferred. The more preferred electrolyte being an aqueous solution of 10-13 molar potassium hydroxide. The most preferred is 13 molar potassium hydroxide.

The anodes used in cells of the present invention may be fabricated from various forms of zinc and/or zinc alloys. Preferred anodes are prepared from finely divided zinc dust. A most preferred anode being prepared from amalgamated zinc particles as these anodes are less susceptible to passivation or hydrogen evolution.

During the intial course of experimentation leading to the present invention, an experimental cell was constructed using a nickel (or titanium) mesh anode impregnated with zinc amalgam, a cathode comprised of $(C_yF_xCl_z)_n$ pressed onto a nickel or titanium mesh screen and 10M KOH electrolyte. The cell was successfully discharged at a cathodic current density of 0.1 mA/cm² resulting in an operating voltage of 1.46 v.

Referring to the drawing, FIG. 1 shows a cross sectional view of the experimental cell used to determine the voltaic performance of the novel cathode material of the invention. The apparatus comprises an inner cylindrical container 10 formed of polytetrafluoroethylene, the bottom of which is bored to allow exposure of the cathode material 11 to the aqueous electrolyte solution and the top of which is provided with a closure cap 16. The outer fluoropolymer cylindrical component 12 contains the zinc anode 13. The cathode 14 and anode 15 have stainless steel disk contacts 20 and 19 respectively, for electrical contact for the cathode and for the anode. A Teflon ring 17 is placed between container 10 and 12 and allows for various volumes of electrolytes to be employed in compartment 18.

Experiments in accordance with the invention were conducted in a sealed cell system as described in FIG. 1. The cathode was continuously discharged until the cell voltage reached a predetermined cut off voltage of 0.6 v.

FIGS. 2-6 depict representative graphs of voltage versus depth of discharge and compares discharge curves for cells employing the novel cathode composition of this invention curve "A" in relationship to prior art $CF_x$ curve "B" at various drain rates.

It has been observed as shown by reference to FIGS. 2-6 and to Table I that voltage output at various drain rates is improved over 300 mV employing the system of this invention. The 300 mV is a significant improvement over prior art $CF_x$ when one considers the fact that the cathodic current densities (drain rates) for the cathode composition of this invention is over twice that of prior art $CF_x$. At drain rates approximating 0.08 mA/cm², the voltage increase over prior art $CF_x$ approaches 500 mV.

Similarly, Table II compares $(C_yF_xCl_z)_n$ to other conventional cathode materials. It will be seen from the table that the energy density of $(C_yF_xCl_z)_n$ exceeds that of all conventional cathode systems. In addition, the cost of $(C_yF_xCl_z)_n$ is substantially less than silver oxide or mercuric oxide. Because of the higher cell voltage, 1.55 volts for zinc/$(C_yF_xCl_z)_n$ versus 1.3 for zinc/$CF_x$, zinc/$(C_yF_xCl_z)_n$ cell can be used as a direct replacement for the expensive zinc/silver oxide cell or the environmentally undesirable zinc/mercuric oxide cell.

The several features and advantages of the invention will be apparent in greater detail by the following examples. It will be understood, however, that although these examples may describe in detail certain preferred conditions of the invention, they are given primarily for purposes of illustration and the invention in its broad aspects is not limited thereto.

EXAMPLE 1

Figure 2:
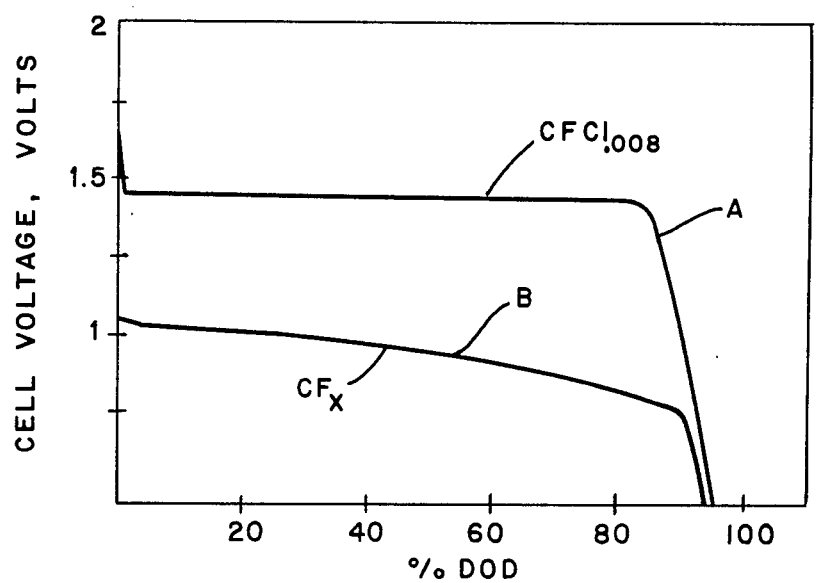
FIGS. 2-6 depict representative graphs of voltage versus depth of discharge and compares discharge curves for cells employing the novel cathode composition of this invention in relationship to known prior art $CF_x$ cells at various drain rates.

An experimental cell was constructed using an amalgamated zinc anode, various electrolyte concentrations of potassium hydroxide and a cathode consisting of 83-85% by weight of $CF_1Cl_{0.008}$, 12-13% by weight acetylene black and 3-5% by weight of poly(tetrafluoroethylene). The cell was discharged across a 10 Kohm load corresponding to a cathodic current density of 0.20 mA/cm². The electrolyte employed in the fabrication of this cell was 13M KOH. FIG. 2 is a plot of observed closed circuit voltages (CCV) versus depth of discharge and compares $CF_1$ to $CF_1$ to $CF_1Cl_{0.008}$. Table I summarizes the pertinent electrochemical data.

EXAMPLE 2

Figure 3:
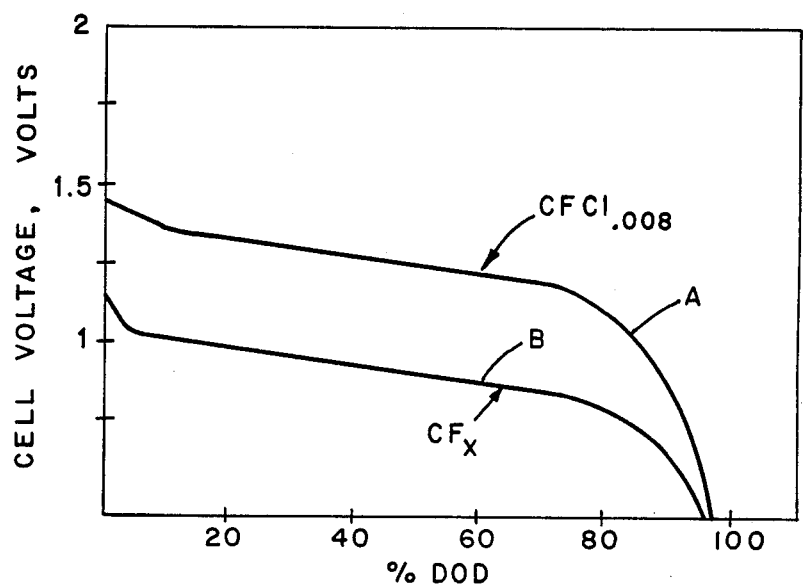

An experimental cell was constructed as described in Example 1 and was discharged across a 1 Kohm load corresponding to a cathodic current density of 2.0 mA/cm². FIG. 3 is a plot of observed voltage versus depth of discharge and compares $CF_1$ to $CF_1Cl_{0.008}$. The pertinent electrochemical data is also summarized in Table I.

EXAMPLE 3

Figure 4:
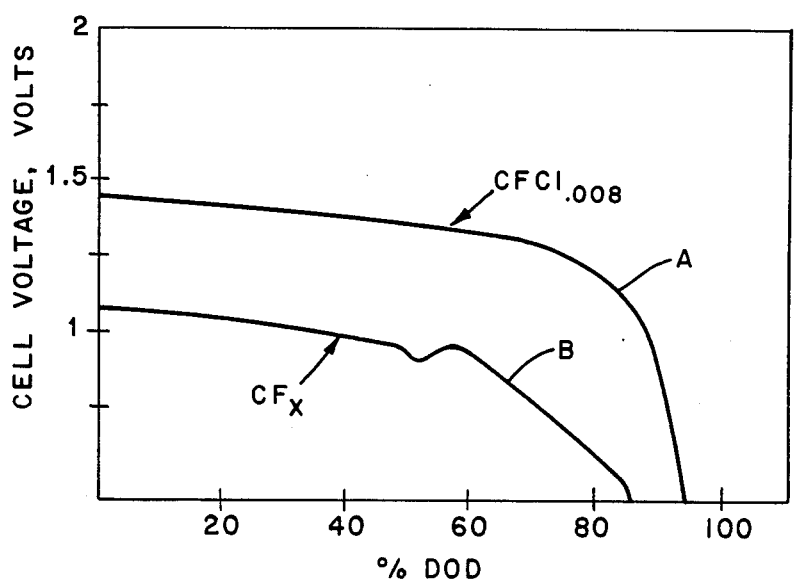

An experimental cell was constructed as described in Example 1 and was discharged across a 10 Kohm load corresponding to a cathodic current density of 0.20 mA/cm$^2$. The electrolyte in this cell was changed to 10M KOH. FIG. 4 is a plot of observed voltage versus depth of discharge and compares to $CF_1$ to $CF_1Cl_{0.008}$. The pertinent electrochemical data are also summarized in Table I.

EXAMPLE 4

Figure 5:
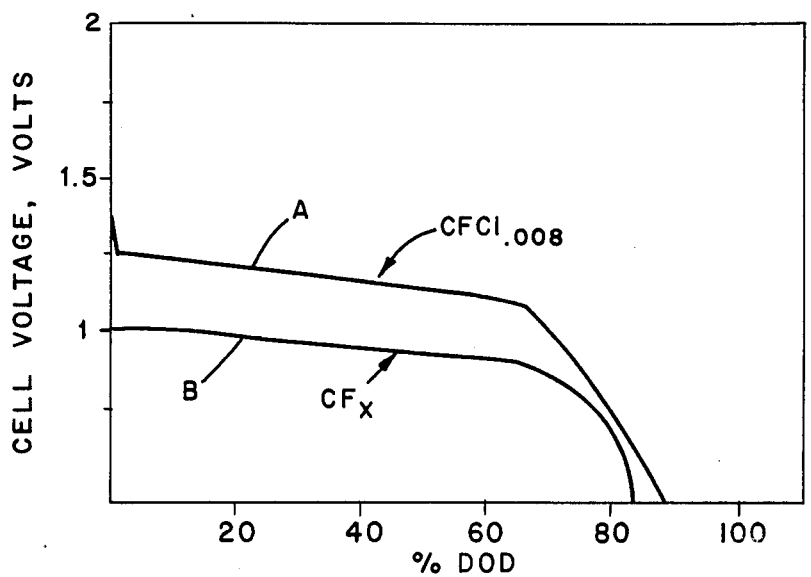

An experimental cell was constructed as described in Example 3 and was discharged across a 1 K ohm load corresponding to a cathodic current density of 2.0 mA/cm$^2$. FIG. 5 is a plot of observed voltage versus depth of discharge and compares $CF_1$ to $CF_1Cl_{0.008}$. The pertinent electrochemical data are summarized in Table I.

EXAMPLE 5

An experimental cell was constructed as described in Example 1 and was discharged across a 10 Kohm load corresponding to a cathodic current density of 0.20 mA/cm$^2$. The electrolyte employed in this example was 5M KOH. The pertinent electrochemical data are summarized in Table I.

EXAMPLE 6

Figure 6:
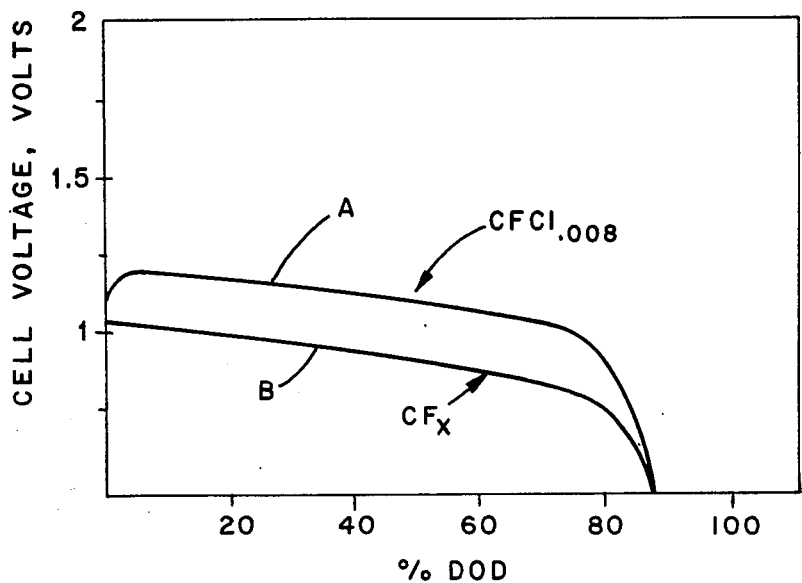

An experimental cell was constructed as described in Example 5 and was discharged across a 1 Kohm load corresponding to a cathodic current density of 2.0 mA/cm$^2$. FIG. 6 is a plot of observed voltage versus depth of discharge and compares $CF_1$ to $CF_1Cl_{0.008}$. The pertinent electrochemical data are summarized in Table I.

TABLE I

| Cell | Electrolyte | OCV | CCV* | CCV** |
|---|---|---|---|---|
| $CF_x$ | 13 M KOH | 1.39 | 1.030 | 1.148 |
| $(C_yF_xCl_z)_n$ | 13 M KOH | 1.55 | 1.30 | 1.436 |
| $CF_x$ | 10 M KOH | 1.37 | 0.962 | 1.186 |
| $(C_yF_xCl_z)_n$ | 10 M KOH | 1.42 | 1.235 | 1.38 |
| $CF_x$ | 5 M KOH | 1.34 | 0.900 | 1.186 |
| $(C_yF_xCl_z)_n$ | 5 M KOH | 1.41 | 1.160 | |

*Cathodic current density for $CF_x$ = 0.8 mA/cm$^2$
Cathodic current density for $(C_yF_xCl_z)_n$ = 2.0 mA/cm$^2$
**Cathodic current density for $CF_x$ = 0.08 mA/cm$^2$
Cathodic current density for $(C_yF_xCl_z)_n$ = 0.2 mA/cm$^2$ The following observations are provided to summarize the improvements over prior art $CF_x$:

(1) By referring to Table I, it is seen that the discharge voltages are significantly higher at all drain rates when compared to prior art $CF_x$. More importantly, the cathodic current densities used for the cathode composition described in this patent were at least twice that of prior art $CF_x$. The new cathode material of this invention out performed all prior art $CF_x$ in all aspects of voltaic performance.

(2) The closed circuit voltage for $(C_yF_xCl_z)_n$ at high drain rate surpasses the voltage obtained for standard $CF_x$ at low drain rate (see Table I).

(3) By referring to FIGS. 2-6, it is seen that the new cathode material produces a stable discharge voltage as indicated by the flat profile of the curves.

(4) The open circuit voltage of this novel cathode material is 1.55 v, over a 350 mV increase over prior art $CF_x$ material.

(5) The cells can be used as a direct replacement for the more expensive silver oxide or mercuric oxide cells (see Table II).

TABLE II

| Material | Density (g/cm$^2$) | Capacity (mAh/g) | Capacity (mAh/cm$^2$) | Cell Voltage Versus Zinc | Energy Density (WH/cm$^2$) |
|---|---|---|---|---|---|
| $Ag_2O$ | 7.14 | 231.2 | 1651 | 1.55 | 2.56 |
| HgO | 11.1 | 247.5 | 2747 | 1.30 | 3.57 |
| $CF_x$ | 2.7 | 864.2 | 2333 | 1.30 | 3.03 |
| $(C_yF_xCl_z)_n$ | 2.7 | 864.1 | 2333 | 1.55 | 3.62 |

From Table II it can be seen that the energy density of $(C_yF_xCl_z)_n$ exceeds that of all conventional cathode systems. Because of the higher cell voltage 1.55 volts for $Zn/(C_yF_xCl_z)_n$ versus 1.3 volts for $Zn/CF_x$ and $Zn/HgO$, $Zn/(C_yF_xCl_z)_n$ cells can be used as direct replacements for the expensive zinc/silver oxide cell or the environmentally undesirable zinc/mercuric oxide cell.

From the foregoing disclosure, it will be apparent that various modifications may be in the conditions and proportions of the invention in its broader aspects. Accordingly, it is understood that variations in the invention may be made to the invention, and such variations are not to be construed as a departure from the invention except as such variation may be excluded by the express limitations of the claims.

What is claimed is:

1. A novel high energy density aqueous cell comprising:
   (a) a zinc anode;
   (b) an aqueous electrolyte; and
   (c) a $(C_yF_xCl_z)$ cathode wherein y has a value of greater than zero up to 2, x is greater than 0 up to 1.2, z is greater than 0 up to 0.1 and n denotes an infinitely large number for a two dimensional array of $C_yF_xCl_z$ units.

2. The battery of claim 1 wherein y is 1 of 2.

3. The battery of claim 1 wherein y has a value of from about 0.8 to 1.0, x has a value of from about 0.7 to 1.1 and z has a value of from about 0.001 to 0.1.

4. The battery of claim 1 wherein y has a value of about 1.0, x has a value within the range of 0.74 to 1.0, and z has a value within the range of 0.001 to 0.01.

* * * * *